US011288536B2

(12) United States Patent
Sakai

(10) Patent No.: US 11,288,536 B2
(45) Date of Patent: Mar. 29, 2022

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Hiroyuki Sakai, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 16/685,916

(22) Filed: Nov. 15, 2019

(65) Prior Publication Data

US 2020/0175308 A1 Jun. 4, 2020

(30) Foreign Application Priority Data

Nov. 30, 2018 (JP) .............................. JP2018-225477

(51) Int. Cl.
*G06K 9/46* (2006.01)
*G06K 9/38* (2006.01)
*G06K 9/34* (2006.01)
*H04N 1/00* (2006.01)
*G06K 9/54* (2006.01)
*G06T 7/136* (2017.01)
*G06T 3/40* (2006.01)

(52) U.S. Cl.
CPC .......... *G06K 9/4638* (2013.01); *G06K 9/346* (2013.01); *G06K 9/38* (2013.01); *G06K 9/54* (2013.01); *G06T 3/4023* (2013.01); *G06T 7/136* (2017.01); *H04N 1/00331* (2013.01); *G06K 2209/01* (2013.01); *G06T 2207/20012* (2013.01); *G06T 2207/20021* (2013.01); *G06T 2207/30176* (2013.01); *H04N 2201/0094* (2013.01)

(58) Field of Classification Search
None
See application file for complete search history.

(56) References Cited

U.S. PATENT DOCUMENTS

| 9,569,662 | B1 * | 2/2017 | Prulhiere | G06K 9/2063 |
| 2004/0096121 | A1 * | 5/2004 | Kanatsu | G06K 9/3208 |
| | | | | 382/290 |
| 2011/0271177 | A1 * | 11/2011 | Bastos dos Santos | ....... |
| | | | | G06F 40/174 |
| | | | | 715/256 |

(Continued)

FOREIGN PATENT DOCUMENTS

JP 06-068031 A 3/1994

*Primary Examiner* — Emily C Terrell
*Assistant Examiner* — Nathan J Bloom
(74) *Attorney, Agent, or Firm* — Canon U.S.A., Inc. IP Division

(57) ABSTRACT

An image processing apparatus includes a determination unit configured to determine a region of the image on which to perform character recognition processing, a decision unit configured to decide, based on a number of black pixels in contact with the region determined by the determination unit, whether to perform the character recognition processing on an expanded region obtained by expanding the region determined by the determination unit rather than on the region determined by the determination unit, and a character recognition unit configured to perform the character recognition processing on that region of the image decided by the decision unit.

13 Claims, 10 Drawing Sheets

(56) References Cited

U.S. PATENT DOCUMENTS

2015/0193667 A1* 7/2015 Acharya .................. G06T 7/10
382/165
2018/0018774 A1* 1/2018 Kacher .................... G06K 9/18
2018/0285675 A1* 10/2018 Jami .................. G06K 9/00456

* cited by examiner

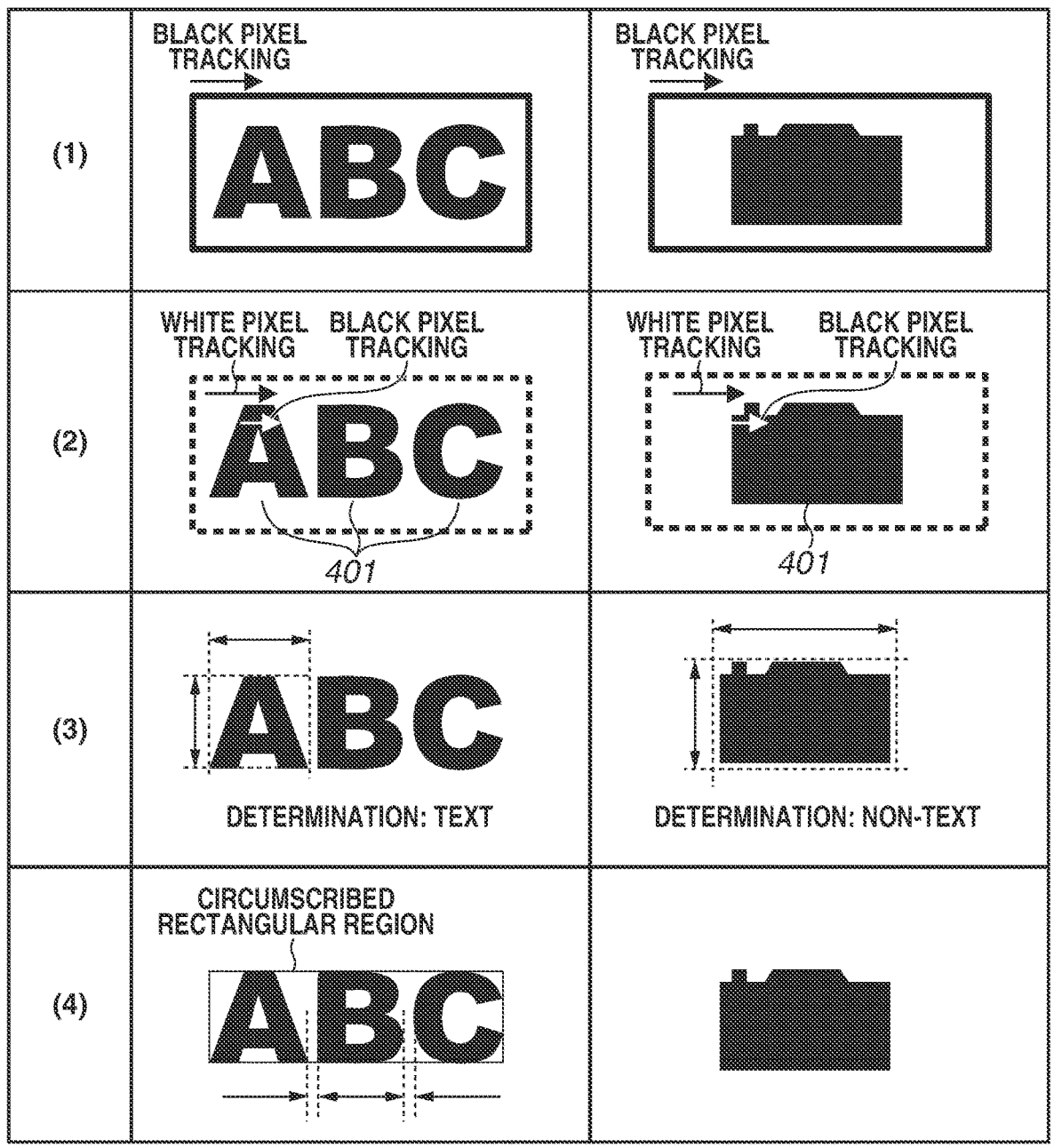

IMAGE PROCESSING APPARATUS, IMAGE PROCESSING METHOD, AND NON-TRANSITORY COMPUTER-READABLE STORAGE MEDIUM

BACKGROUND

Field

The present disclosure relates to an image processing apparatus, an image processing method, and a non-transitory computer-readable storage medium.

Description of the Related Art

Japanese Patent Application Laid-Open No. H06-068031 discusses an image processing apparatus configured to input image information, detect continuous black pixels to recognize a rectangle, and tentatively identify attributes of a character, a graphic, and so on by using information on a region defined by the recognized rectangle. The image processing apparatus calculates a histogram of the recognized region to recognize an object in the image as an object having different attributes.

SUMMARY

In a case where a character in an image indicated by image data is in contact with a line such as a ruled line or an underline, it may be impossible to appropriately recognize the character and the line as objects having different attributes. According to the method discussed in Japanese Patent Application Laid-Open No. H06-068031, continuous black pixels are labeled with the identical label so that the continuous black pixels are recognized as one object. For this reason, objects that are not in contact with each other can be recognized as objects having different attributes, but objects that are in contact with each other cannot be recognized as objects having different attributes.

Accordingly, in the method discussed in Japanese Patent Application Laid-Open No. H06-068031, in a case where a character and a line cannot be appropriately recognized as objects having different attributes, a user cannot recognize a desired character when character recognition processing is performed on a region containing the character.

The present disclosure features prevention of reduction in accuracy of character recognition processing in a case where a character and a line are in contact with each other in an image indicated by image data.

According to an aspect of the present disclosure, an image processing apparatus includes a determination unit configured to determine a region of the image on which to perform character recognition processing, a decision unit configured to decide, based on a number of black pixels in contact with the region determined by the determination unit, whether to perform the character recognition processing on an expanded region obtained by expanding the region determined by the determination unit rather than on the region determined by the determination unit, and a character recognition unit configured to perform the character recognition processing on that region of the image decided by the decision unit.

Further features of the present disclosure will become apparent from the following description of exemplary embodiments with reference to the attached drawings.

BRIEF DESCRIPTION OF THE DRAWINGS

FIGS. 4A and 4B are diagrams illustrating an example of block selection processing.

DESCRIPTION OF THE EMBODIMENTS

A configuration of exemplary embodiments for describing modes for carrying out the present disclosure with reference to the drawings is an example, and the present disclosure is not limited to the illustrated configuration.

In a first exemplary embodiment, a multi-function peripheral (MFP) 100 is to be described as an example of an image processing apparatus, but the image processing apparatus is not limited to the MFP 100. For example, the image processing apparatus may be a personal computer (PC), a facsimile, a digital camera, or a smartphone, as long as the image processing apparatus can generate image data, or accept an input of image data, and perform optical character recognition (OCR) processing.

Figure 1:
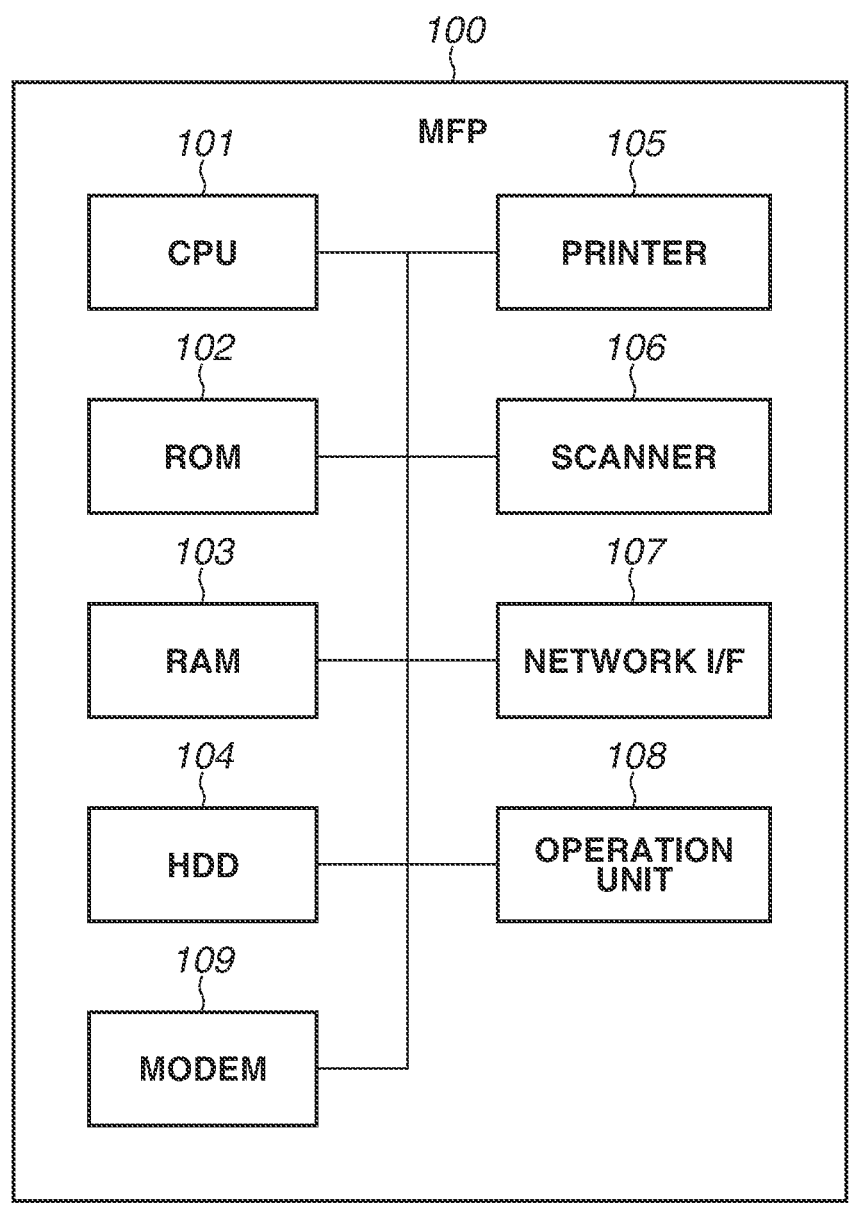
FIG. 1 is a diagram illustrating an example of the hardware configuration of a multi-function peripheral (MFP).

FIG. 1 is a diagram illustrating an example of the hardware configuration of the MFP 100. The MFP 100 includes a central processing unit (CPU) 101, a read-only memory (ROM) 102, a random-access memo (RAM) 103, a hard disk drive (HDD) 104, a printer 105, a scanner 106, a network interface (I/F) 107, an operation unit 108, and a modem 109.

The CPU 101 controls pieces of hardware 102 to 109 included in the MFP 100 to implement the individual functions of the MFP 100. The CPU 101 sends a signal to each piece of hardware via a bus line and performs mutual data communication with other pieces of hardware.

The ROM 102 stores, therein, programs and various data to be used by the CPU 101. The RAM 103 is a working memory for temporarily storing programs or data used by the CPU 101 for computing. The HDD 104 stores, therein, various data and programs. In the present exemplary embodiment, the MFP 100 uses the HDD 104 as an auxiliary storage device. However, the auxiliary storage device may be a nonvolatile memory such as a solid state drive (SSD).

The printer 105 is a unit to implement a print function. The printer 105 performs processing for printing an image on a paper sheet on the basis of image data included in a print job sent from an external apparatus (not illustrated).

The scanner 106 is a unit to implement a scan function. The scanner 106 is a reading unit that performs processing for optically reading out a document to convert the document thus read out to image data.

The CPU 101 of the MFP 100 controls operation of the MFP 100 in accordance with a control program in the MFP 100. More specifically, the CPU 101 executes an operating system (OS) that controls the MFP 100 and a driver program that controls a hardware interface. Application programs in the OS are mutually operated, so that a function desired by a user is operated and controlled. The OS and the various programs are stored in the ROM 102. The OS and the various programs are read out from the ROM 102 to the RAM 103, so that the OS and the various programs are implemented.

The network I/F 107 of the MFP 100 may be a local area network (LAN) I/F for wired connection or may be connected by a universal serial bus (USB)-LAN adapter. The network I/F 107 may be a LAN I/F for wireless connection.

The network I/F 107 of the MFP 100 is connected to the external apparatus via a network.

The operation unit 108 is a user interface for the user of the MFP 100 to use the printer 105, the scanner 106, and so on. The operation unit 108 is an accepting unit, for example, as a touch panel, for receiving operation and input. The operation unit 108 can also be used as a display unit for displaying information about the MFP 100. An operation device and a display device of the MFP 100 according to the present exemplary embodiment may be connected to outside of the MFP 100.

The modem 109 receives a facsimile signal via a public switched telephone network (PSTN) to perform modulation and demodulation on a signal necessary for facsimile communication. The MFP 100 accepts an input of image data by reading out an image of the document, via the network I/F 107, via the modem 109, or by reading out image data stored in the HDD 104. A digital camera or a smart phone accepts an input of image data by imaging.

For example, in a case where a character in an image indicated by image data is in contact with a line such as a ruled line or an underline, it may be impossible to appropriately recognize the character and the line as objects having different attributes. According to the method of Japanese Patent Application Laid-Open No. H06-068031, objects that are not in contact with each other can be recognized as objects having different attributes, but objects that are in contact with each other cannot be recognized as objects having different attributes.

Accordingly, there is an issue that in a case where a character and a line cannot be appropriately recognized as objects having different attributes, a user cannot recognize a desired character when character recognition processing is performed on a region containing the character.

In order to solve the issue described above, the MFP 100 according to the present exemplary embodiment performs processing to be described below. Accordingly, in a case where a character and a line are in contact with each other in an image indicated by image data, it is possible to prevent reduction in accuracy of character recognition processing.

Figure 2:
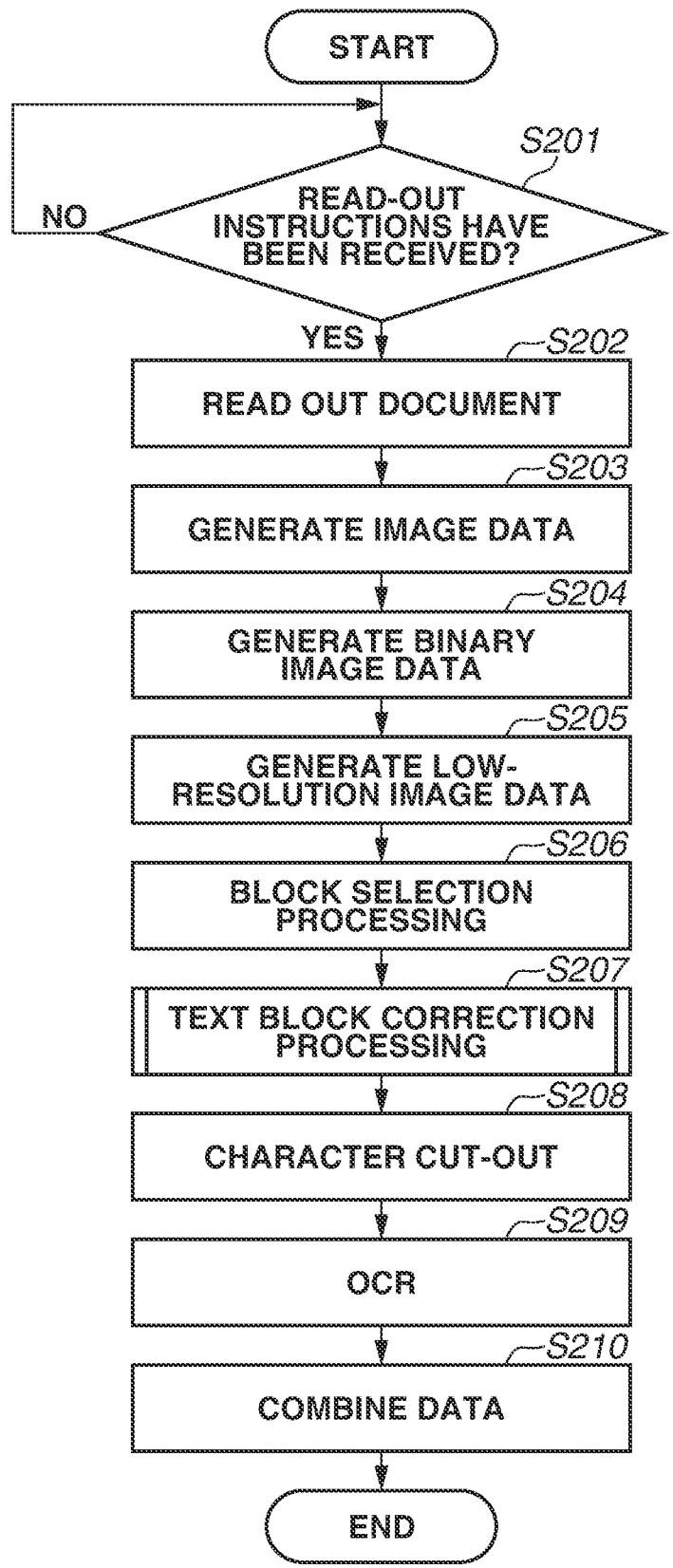
FIG. 2 is a flowchart illustrating an example of character recognition processing.

FIG. 2 is a flowchart illustrating an example of character recognition processing. In the flowchart in FIG. 2, as an example of inputting image data, the CPU 101 controls the scanner 106 to read out an image of a document and to generate image data. The CPU 101 reads out a program stored in the ROM 102 to the RAM 103, and executes the program, so that the processing illustrated by the flowchart in FIG. 2 is implemented. The processing flow in FIG. 2 is started in response to the MFP 100 being turned ON.

In step S201, the CPU 101 determines whether read-out instructions based on which the image of the document is read out have been received from the user via the operation unit 108. If the CPU 101 determines that the read-out instructions have been received (YES in step S201), then the processing proceeds to step S202. If the CPU 101 determines that the read-out instructions have not been received (NO in step S201), then the processing returns to step S201.

In step S202, the CPU 101 controls the scanner 106 to read out the image of the document.

In step S203, the CPU 101 generates image data on a bitmap image that is represented by information in units of pixels from a pixel signal generated in response to the document being read out in step S202, and stores the generated image data into the RAM 103. In this case, it is preferable that pixel data be binary pixel data, namely, black and white image data. The image data may be either a halftone image in which the individual pixels are represented by one of a plurality of gray tone values, or color image data in which the individual pixels are represented by multi-bit word representing pixel colors.

In step S204, binary image data is generated from the image data stored into the RAM 103 in step S203. With a method for generating the binary image data, a pixel having density greater than a threshold in an input image is used as a black pixel, for example, and a pixel having density smaller than or equal to the threshold in the input image is used as a white pixel, for example. The result of binarization may be represented in colors other than black and white, or, alternatively, by values 1 and 0 or values 0 and 1, instead of colors. A purpose of the processing in step S204 is to distinguish between the pixels having density greater than the threshold and the pixels having density smaller than or equal to the threshold. However, instead of the binarization, for example, ternarization or quaternization is possible as long as the same purpose is achieved. Hereinafter, the description is provided supposing that, in step S204, binary image data has been generated. In a case where input image data is color multivalued image data, binarization is performed only on luminance (for example, Y of YUV) of the multivalued image data. A known technique is used as a method for calculating a threshold for binarization. The known technique may be, for example, simple binarization processing, error diffusion processing, or screen processing.

In step S205, the CPU 101 generates low-resolution image data that corresponds to the binary image data, generated in step S204, with resolution reduced. A method for generating such low-resolution image data is to be described with reference to FIGS. 3A to 3G.

FIGS. 3A to 3G are diagrams illustrating an example of block selection processing. Processing for reducing the resolution is processing for converting, for example, an image 301 with 300 dots per inch (dpi) in FIG. 3A to an image 302 with 75 dpi in FIG. 3B. In this example, in order to reduce the resolution from 300 dpi to 75 dpi, a block of 4×4 pixels is set as one pixel. For example, if more than or equal to half of the 4×4 pixels in the block are black pixels, then that one pixel corresponding to the pixel block is set as a black pixel. If more than or equal to half of the 4×4 pixels in the block are white pixels, then that one pixel corresponding to the pixel block is set as a white pixel.

In step S206, the CPU 101 performs the block selection processing on the low-resolution image data generated in step S205. The block selection processing is described with reference to FIGS. 4A and 4B.

FIGS. 4A and 4B are diagrams illustrating an example of the block selection processing. The contour of black pixels in a binary image is tracked so that a cluster of black pixels (black pixel cluster) is extracted. In the contour tracking, it is determined which of the eight directions of upper left, left, lower left, down, lower right, right, upper right, and up, the black pixels are continuous in. For example, in FIG. 4A (1) and FIG. 4B (1), black pixel clusters in the frame are extracted. Referring to FIG. 4A (1), since the frame surrounding "A", "B", and "C" is represented by adjacent black pixels, the inside of the frame is also extracted as a black pixel cluster.

If the extracted black pixel clusters include a black pixel cluster larger than a certain size, then whether the region has a white pixel cluster is identified. To be specific, the contour of white pixels is tracked in the black pixel cluster region so that a white pixel cluster is extracted. In tracking the contour of the white pixels, it is determined which of the four directions of left, down, right, and up, the white pixels are continuous in. For example, in FIG. 4A (2) and FIG. 4B (2), the contour of white pixels inside the frame is tracked so that a white pixel cluster is extracted. Further, if the extracted white pixel cluster is larger than the certain size, then the contour of black pixels in the white pixel cluster is tracked again to extract a black pixel cluster. For example, in FIG. 4A (2), the contour of the black character part is tracked so that a black pixel cluster is extracted. The processing described above is repeated until a size of the pixel cluster becomes the certain size or smaller. The processing is performed in order to extract a character region in a region defined by the frame, for example. As a result of the processing, black pixel clusters 401 as illustrated in FIGS. 4A (2) and 4B (2) are acquired. For the sake of convenience, in FIGS. 4A (2) and 4B (2), each of the frame surrounding "A", "B", and "C" and the frame surrounding a picture of a camera is denoted by a dotted line.

The black pixel clusters 401 acquired in the processing described above are classified into a character or a picture by using at least one of size, shape, and black pixel density. For example, the black pixel cluster, such as the character illustrated in FIG. 4A (3), having an aspect ratio close to 1 and having a size within a predetermined size range is determined to be a black pixel cluster constituting a character. Other black pixel cluster is determined to be a black pixel cluster constituting a picture. In this example, "A", "B", and "C" in FIG. 4A (3) are black pixel clusters each constituting a character, and a camera image in FIG. 4B (3) is a black pixel cluster constituting a picture.

In a case where a distance between ends of the black pixel clusters, each of which is determined to be a character, is equal to or smaller than a predetermined value, the black pixel clusters are categorized as the same group. In addition, a circumscribed rectangular region including all of the black pixel clusters categorized as the same group is stored, as a text block, into the RAM 103. For example, if a distance between the characters is short as illustrated in FIG. 4A (4), then a character string of "A", "B", and "C" is determined to be one text block. A black pixel cluster constituting a character, around which no other black pixel clusters constituting a character are present within a predetermined distance, makes one independent group by itself. Accordingly, a circumscribed rectangular region of the independent black pixel cluster is determined to be a text block. The same processing is also applied to a black pixel cluster constituting a picture. Positions of the individual blocks and attributes determination information (text or non-text) on the blocks are stored as the determination result into the RAM 103.

Figure 3A:
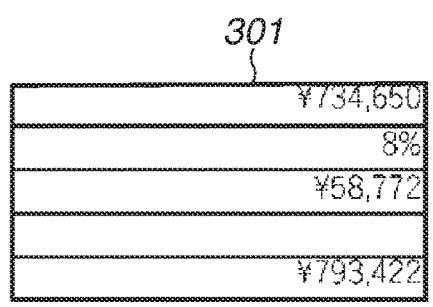
FIGS. 3A, 3B, 3C, 3D, 3E, 3F, and 3G are diagrams illustrating an example of block selection processing.
Figure 3B:
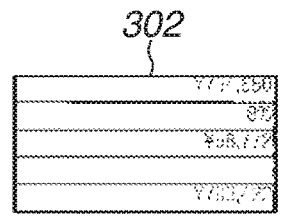
Figure 3C:
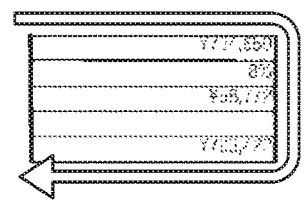
Figure 3D:
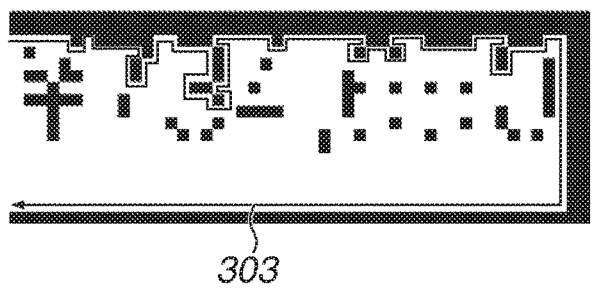

An example in which the block selection processing of step S206 is performed on the image 302 in FIG. 3B is described with reference to FIG. 3D illustrating an enlarged view of an upper right part of the image 302. The contour of the black pixels is tracked in the direction indicated by an arrow in FIG. 3C so that a black pixel cluster (outer frame of the image 302 in this example) is extracted.

Figure 3E:
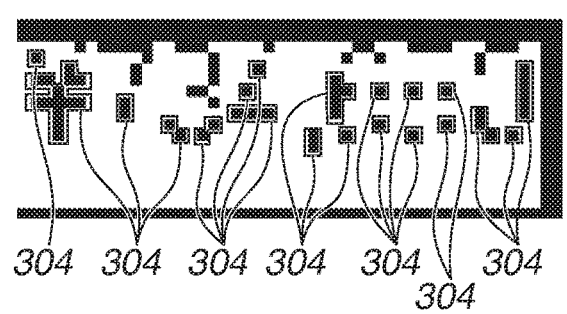
Figure 3F:
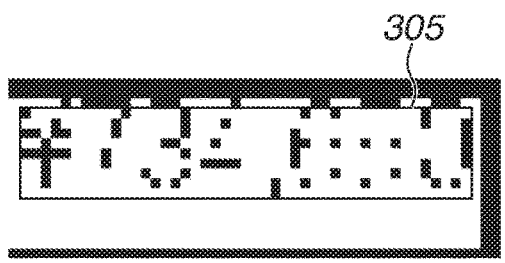
Figure 3G:
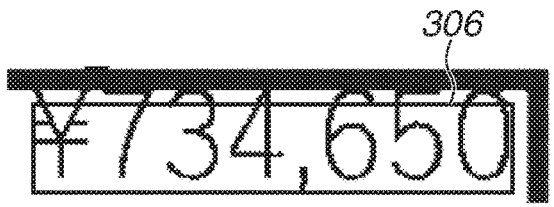

Processing for tracking the contour of the white pixels in the region of the black pixel cluster is described with reference to FIG. 3D. In this example, FIG. 3D is an enlarged view of the upper right part of the image 302. When the contour of the white pixels is tracked in an image as illustrated in FIG. 3D, a region inside an arrow 303 is extracted. Search for black pixels is further performed on the region within the white pixel contour (inside the arrow 303). Consequently, black pixel clusters such as black pixel clusters 304 illustrated in FIG. 3E are acquired. Processing for classifying the black pixel clusters into a character or a picture, and processing for categorizing the black pixel clusters into groups are performed. As a result, a text block 305 as illustrated in FIG. 3F is generated. At this time, an upper part of a character in contact with a ruled line is not extracted as a black pixel cluster in the processing for tracking the contour of the white pixels in the black pixel cluster region, but is present outside the region of the text block 305. In other words, the upper part of the character in contact with the ruled line is selected as a non-text block. FIG. 3G illustrates a result of applying the text block 305 to image data whose resolution has not yet been reduced. A text block 306 is a text block that has been enlarged in accordance with a reduction ratio of image data size so that the text block is applied to the image data whose resolution has not yet been reduced. For example, in a case where the block selection is performed on an image that has been reduced from aspect ratio 300 dpi to aspect ratio 75 dpi, the image vertically and horizontally quadruples. The description of step S206 ends.

In step S207, the CPU 101 performs processing for correcting a text block. Text block correction is described with reference to the flowchart in FIG. 5 and FIGS. 6A to 6D. The processing is performed on image data obtained by combining the image data whose resolution has not yet been reduced with the text block determined in step S206.

The text block 306 is the upper right end part obtained by enlarging the text block 305 determined in step S206 at the same magnification as that for the image whose resolution has been reduced and applying the enlarged text block 305 to the image 301 whose resolution has not yet been reduced.

Figure 5:
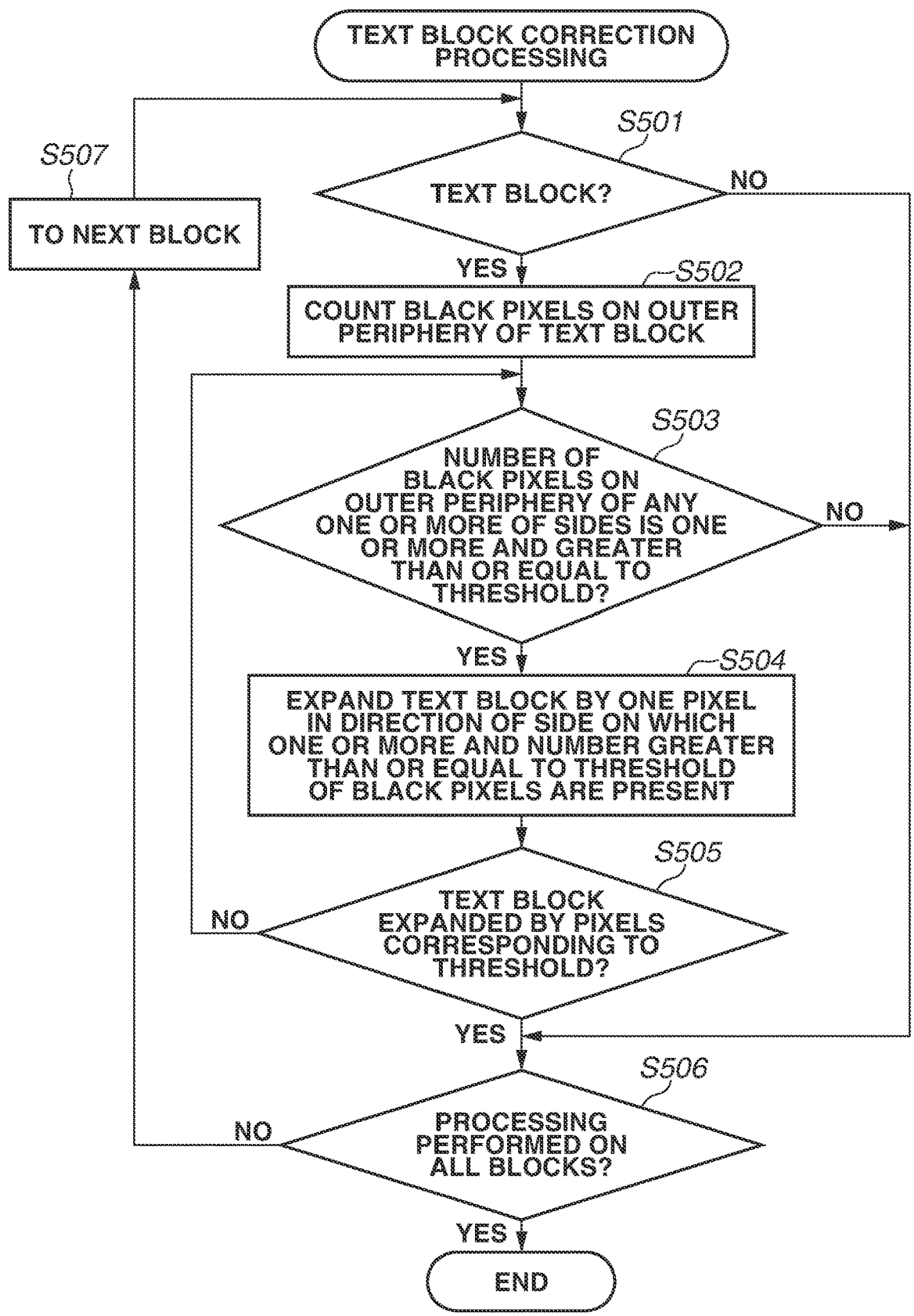
FIG. 5 is a flowchart illustrating an example of text block correction processing.

FIG. 5 is a flowchart illustrating an example of text block correction processing. The CPU 101 reads out a program stored in the ROM 102 to the RAM 103 and executes the program, so that the processing illustrated in the flowchart in FIG. 5 is implemented. The processing flow in FIG. 5 is started in response to the processing of step S206 being completed.

In step S501, the CPU 101 determines whether the region determined to be a block in step S206 is a text block or a non-text block. To be specific, the CPU 101 determines whether the region is a text block on the basis of the attributes determination information on the block stored in the RAM 103. If the CPU 101 determines that the region is a text block (YES in step S501), then the processing proceeds to step S502. If the CPU 101 determines that the region is not a text block (NO in step S501), the processing proceeds to step S506.

In step S502, the CPU 101 searches for a black pixel on the outer periphery of the text block. The processing for searching for a black pixel on the outer periphery of the text block is described with reference to FIGS. 6A to 6D. FIGS. 6A to 6D are diagrams illustrating an example of processing of searching for a black pixel on the outer periphery of the text block. For example, in a case where the processing is performed on the text block 306 in an image 601 in FIG. 6A, the CPU 101 counts the number of black pixels outside, by one pixel, of the upper, lower, left, and right sides 602 to 605 of the text block illustrated in FIG. 6B.

In step S503, the CPU 101 determines whether the number of black pixels, counted in step S502, each of which is present on a line outside of the individual sides of the text block by one pixel is equal to a predetermined number. To be specific, in each of the sides, if the counted number of black pixels is determined to be one or more and smaller than or equal to a threshold (90% of the number of pixels on the side to be searched, for example) (YES in step S503), then it is determined that the block selection processing has not been performed appropriately, and the processing proceeds to step S504. If the counted number of black pixels is 0 (zero), or, alternatively, if the counted number of black pixels is greater than the threshold (NO in step S503), then the processing proceeds to step S506. In other words, in this processing, it is determined whether a pixel representing a character is present outside the region defined by the text block. The number of black pixels based on which determination is made that the block selection processing has not been appropriately performed is not limited to a value that is one or more and 90% or less of the number of pixels on the side to be searched, and may be 10% or more and 90% or less of the number of pixels on the side to be searched. The threshold of the number of black pixels based on which determination is made that the block selection processing has not been appropriately performed may be a value determined at factory setting, and may be changed later via the operation unit 108.

As a result of searching the sides 602 to 605, the number of black pixels is one or more and smaller than or equal to the threshold, on a line outside of the side 602 by one pixel. It is thus determined that the block selection processing has not been appropriately performed on the text block 306 in view of the result of searching the side 602. In other words, it is decided that the text block is to be expanded. In contrast, if the block selection processing has been appropriately performed on the text block 306, then it is decided that the text block is not to be expanded.

Figure 6A:
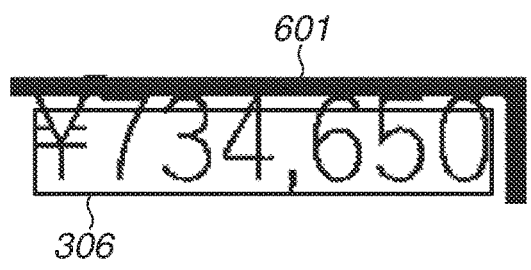
FIGS. 6A, 6B, 6C, and 6D are diagrams illustrating an example of black pixel search processing on an outer periphery of a text block.
Figure 6B:
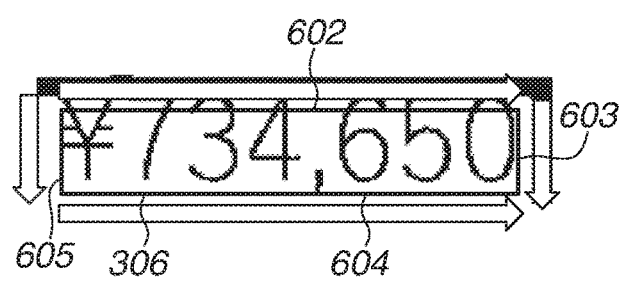
Figure 6C:
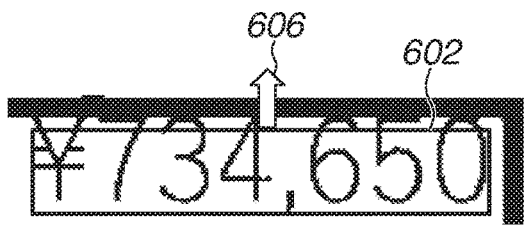

In step S504, the CPU 101 expands the text block by one pixel in the direction of the side on which the number of pixels counted in step S503 is one or more and smaller than or equal to the threshold. Since it is determined that the block selection processing has not been appropriately performed on the text block 306 in view of the result of searching the side 602, the text block 306 is expanded by moving the side 602 by one pixel in the direction indicated by an arrow 606 as illustrated in FIG. 6C. At the time of expansion, the number of times of expansion of the text block by moving the side is increased by one.

In step S505, the CPU 101 determines whether a block has been expanded the number of times corresponding to the predetermined threshold. To be specific, the CPU 101 determines whether the number of times of expansion counted reaches the threshold. If it is determined that the number of times of expansion of the block counted has reached the threshold (YES in step S505), then the processing proceeds to step S506. If it is determined that the number of times of expansion of the block counted has not reached the threshold (NO in step S505), the processing goes back to step S503. In a case where the resolution of an image with 300 dpi is reduced to an image with 75 dpi and the block selection is performed, the contour of white pixels inside by one pixel from a black pixel in the vicinity of a line is tracked. It is thus conceived that expansion by at least 4 pixels is necessary in conversion of pre-low resolution image size. For this reason, a threshold for this example is set at 4. In this example, a line is in contact with the upper part of a character in an image. Correction can be made by the same procedure in a case where a line is in contact with a side and a lower part of a character.

Figure 6D:
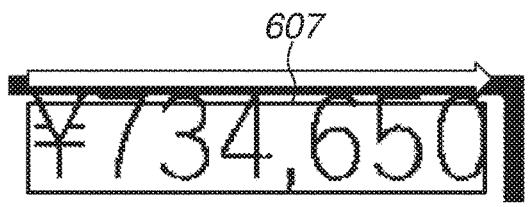

In step S506, the CPU 101 determines whether the processing has been performed on all of the text blocks. If the CPU 101 determines that the processing has been performed on all of the text blocks (YES in step S506), then the processing ends. If the CPU 101 determines that the processing has not been performed on all of the text blocks (NO in step S506), the processing proceeds to step S507. The block selection processing is not appropriately performed in some cases, such as a case of a text block 607 as illustrated in FIG. 6D, even if expansion by one pixel has been performed. For this reason, expansion can be made a plurality of times.

In step S507, the CPU 101 selects a block on which the processing has not yet been performed, and the processing proceeds to step S501. The description of the text block correction processing in step S207 ends.

The description goes back to FIG. 2. In step S208, the CPU 101 performs character cut-out processing on each of the text blocks generated in step S207. The character cut-out processing is described with reference to FIGS. 7A and 7B. The processing is performed on image data obtained by combining the image whose resolution has not yet been reduced with the text block enlarged in step S207.

Figure 7A:
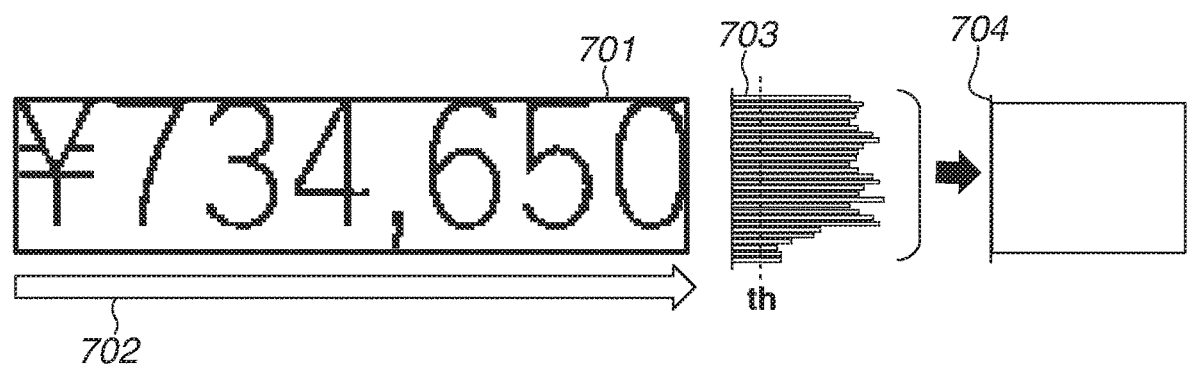
FIGS. 7A and 7B are diagrams illustrating an example of character cut-out processing.
Figure 7B:
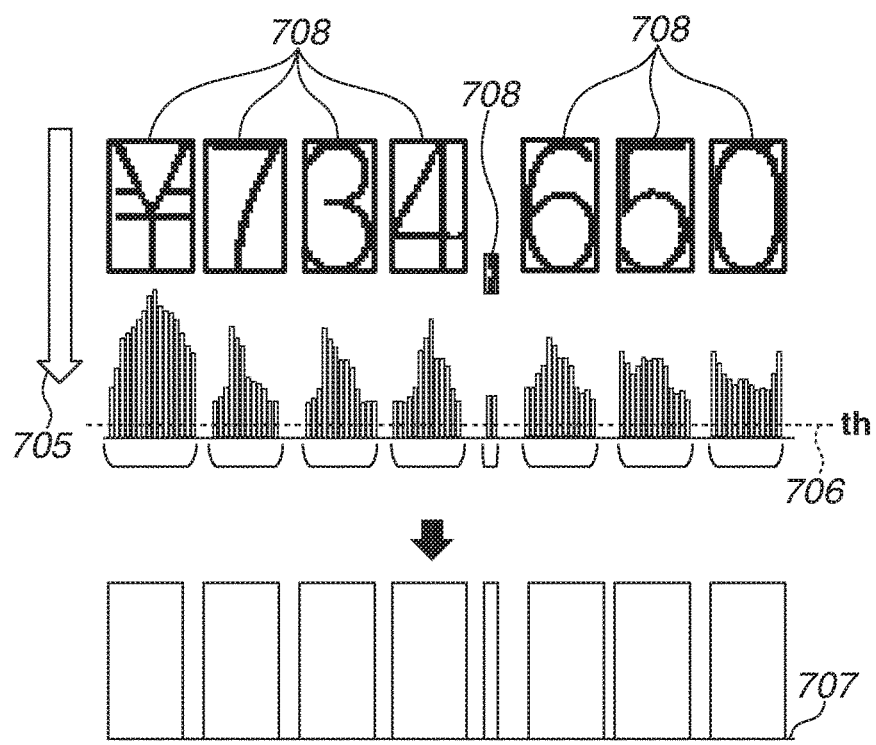

FIGS. 7A and 7B are diagrams illustrating an example of the character cut-out processing. A text block 701 in FIG. 7A is an example of the text block expanded in the processing in FIG. 5.

The CPU 101 counts how many black pixels are present in the text block 701 in the direction indicated by an arrow 702. The result is illustrated by a graph 703 in FIG. 7A. The graph 703 is a histogram illustrating the number of black pixels in each line in the direction indicated by the arrow 702. In the graph 703, the CPU 101 makes one group of consecutive lines in the vertical direction where the number of black pixels greater than a threshold th are present. In the example of a text block such as the text block 701, all lines are consecutive. In such a case, a division result is similar to that of a group 704 in FIG. 7A and the group is not divided.

As for this group (in this example, the text block 701 is to be processed because the group is not divided), the CPU 101 counts how many black pixels are present in the direction indicated by an arrow 705 in FIG. 7B. The result is illustrated by a graph 706 in FIG. 7B. The graph 706 is a histogram illustrating the number of black pixels in each line of the direction indicated by the arrow 705. In the graph 706, the CPU 101 makes one group of consecutive lines in the horizontal direction where the number of black pixels greater than the threshold th are present. In a case where the processing is performed on the text block 701, eight groups 707 are made in FIG. 7B. The eight groups include groups constituting line groups of "\", "7", "3", "4", ",", "6", "5", and "0", respectively.

The CPU 101 cuts out, as a character cut-out rectangle, a circumscribed rectangle of a group of each of line groups. As a result, a circumscribed rectangle of each character is cut out as the character cut-out rectangle. The result of cut-out is shown in a character cut-out rectangle 708. The CPU 101 repeats the foregoing processing until no more character regions which have not yet been processed is present.

In step S209, the CPU 101 performs OCR processing on the character cut-out rectangle cut out in step S208. In the OCR processing, a known method is used to perform comparison processing between the individual characters and characters in a character dictionary stored in the ROM 102. An index of the character dictionary usually corresponds to one character. In some cases, however, another index may be prepared for a character string which is difficult to separate, e.g., "f" or "i", and for a character which is easy to separate, e.g., "j". A pair of contact characters which are difficult to separate is used as a dictionary index in some cases, and a part of one character which is easy to separate is used as a dictionary index in other cases. An identifier for a character image is selected on the basis of the comparison processing, and the selected character identifier is stored into the RAM 103.

In step S210, the image data generated in step S203 and the character identifier generated in step S209 are combined with each other to generate a portable document format (PDF) file. Instead of reading out the document, when a Joint Photographic Experts Group (JPEG) image is input via the modem 109 and the like, it is possible to generate a PDF file by combining meta data and image data that are generated in the character recognition processing.

The processing described above is performed, so that the reduction in the accuracy of character recognition processing can be prevented in a case where a character and a line are in contact with each other in an image indicated by image data.

In the first exemplary embodiment, the example is described in which image data whose resolution has not yet been reduced is used to perform the text block correction. In a second exemplary embodiment, a difference from the first exemplary embodiment is mainly described by using an example in which image data whose resolution has been reduced is used to perform the text block correction.

Figure 8:
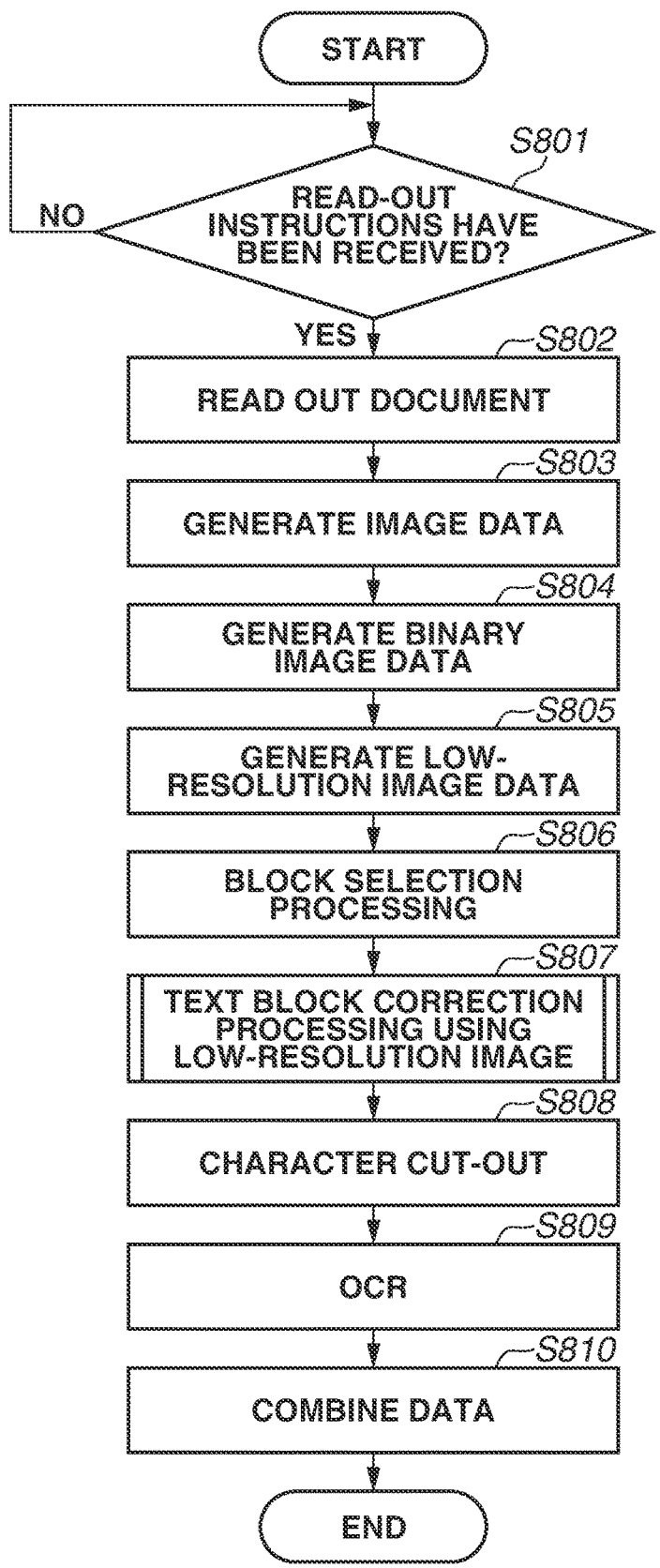
FIG. 8 is a flowchart illustrating an example of character recognition processing.

FIG. 8 is a flowchart illustrating an example of the character recognition processing. The CPU 101 reads out a program stored in the ROM 102 to the RAM 103 and executes the program. In this way, the processing of the flowchart in FIG. 8 is implemented. The processing flow in FIG. 8 is started in response to the MFP 100 being turned ON.

The description of step S801 to step S806 is omitted because the processing thereof is similar to that of step S201 to step S206 in FIG. 2.

In step S807, the CPU 101 performs the text block processing on image data obtained by combining the low-resolution image data generated in step S805 with the text block determined in step S806. The details thereof are described with reference to the flowchart of FIG. 9 and FIGS. 10A to 10D.

Figure 9:
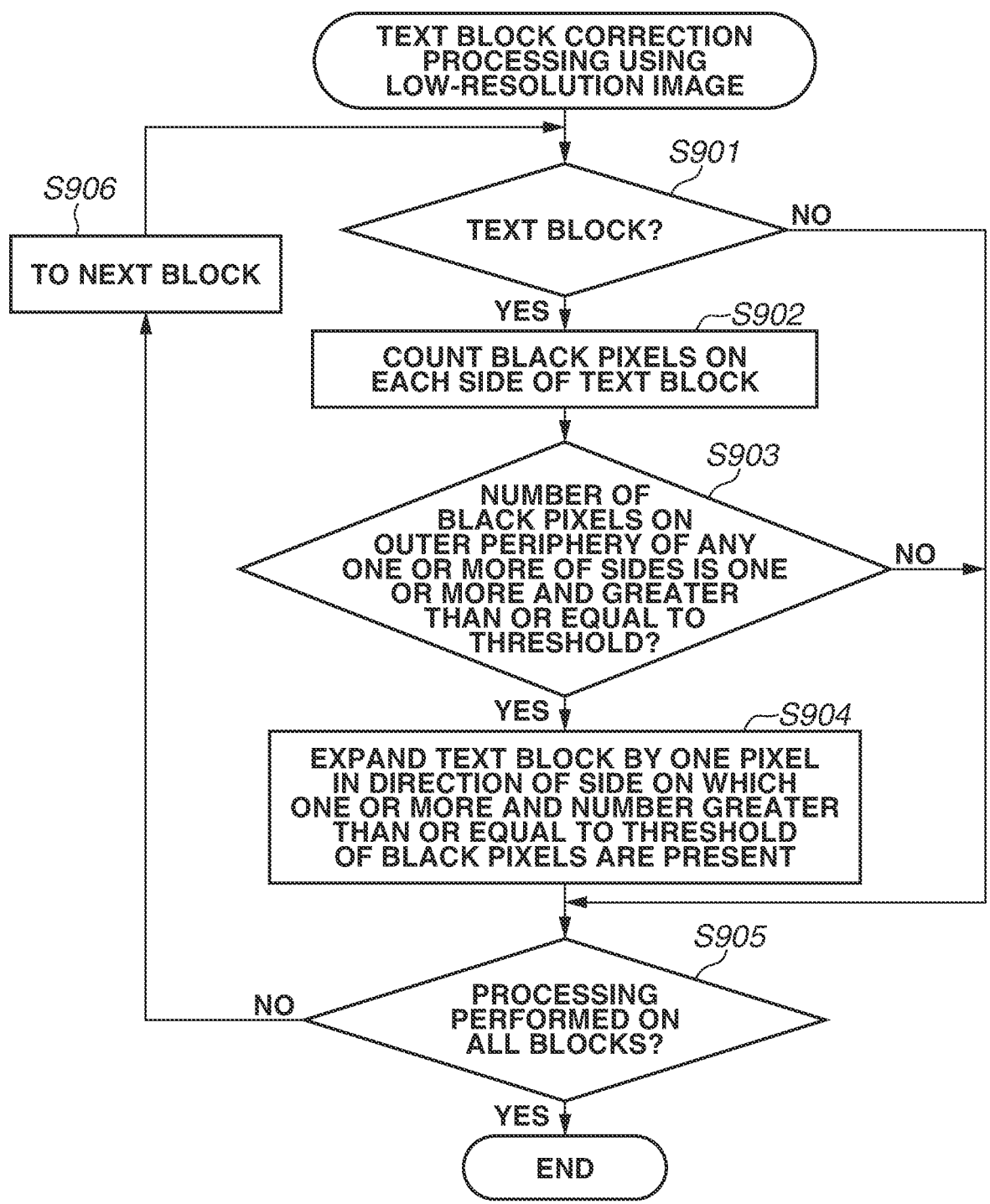
FIG. 9 is a flowchart illustrating an example of text block correction processing.

FIG. 9 is a flowchart illustrating an example of text block correction processing. The CPU 101 reads out a program stored in the ROM 102 to the RAM 103 and executes the program, so that the processing illustrated in the flowchart in FIG. 9 is implemented. The processing flow of FIG. 9 is started in response to the processing of step S806 being completed.

In step S901, the CPU 101 determines whether the region determined to be a block in step S806 is a text block or a non-text block. To be specific, the CPU 101 determines whether the region is a text block on the basis of the attributes determination information on the block stored in the RAM 103. If the CPU 101 determines that the region is a text block (YES in step S901), then the processing proceeds to step S902. If the CPU 101 determines that the region is not a text block (NO in step S901), the processing proceeds to step S905.

In step S902, the CPU 101 searches for a black pixel on the outer periphery of the text block. The processing for searching for a black pixel on the outer periphery of the text block of the low-resolution image data is described with reference to FIGS. 10A to 10D. FIGS. 10A to 10D are diagrams illustrating an example of processing of searching for a black pixel on the outer periphery of the text block in low-resolution image data. For example, in a case where the processing is performed on the text block 305 in an image 601 in FIG. 10A, the CPU 101 counts the number of black pixels outside by one pixel of the upper, lower, left, and right sides 1001 to 1004 of the text block illustrated in FIG. 10B.

In step S903, the CPU 101 determines the number of black pixels, counted in step S902, which are present on the line outside of the individual sides of the text block by one pixel. If, in each of the sides, the counted number of black pixels is one or more and smaller than the threshold (100% of the number of pixels on the side to be searched, for example) (YES in step S903), then it is determined that the block selection processing has not been appropriately performed, and the processing proceeds to step S904. If the counted number of black pixels is zero, or, alternatively, if 100% of the counted number of pixels on the side to be searched is black pixel (NO in step S903), then the processing proceeds to step S905. As for the result of searching the sides 1001 to 1004, the number of black pixels is one or more and smaller than or equal to the threshold, on a line outside of the side 1001 by one pixel, and no black pixels are present on a line outside of the sides 1002 to 1004 by one pixel. It is thus determined that the block selection processing has not been appropriately performed on the text block 305 in view of the result of searching the side 1001.

Figure 10A:
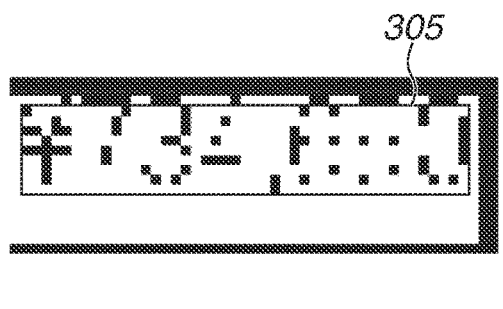
FIGS. 10A, 10B, 10C, and 10D are diagrams illustrating an example of black pixel search processing on an outer periphery of a text block in low-resolution image data.
Figure 10B:
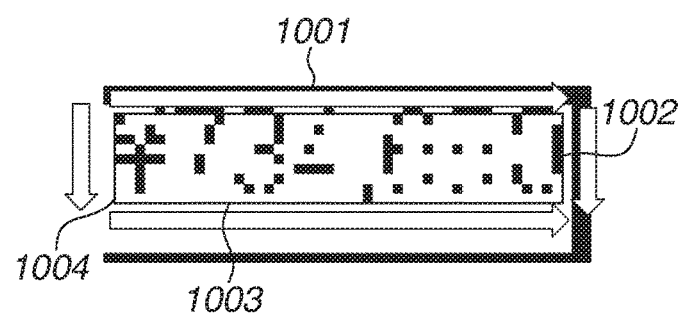
Figure 10C:
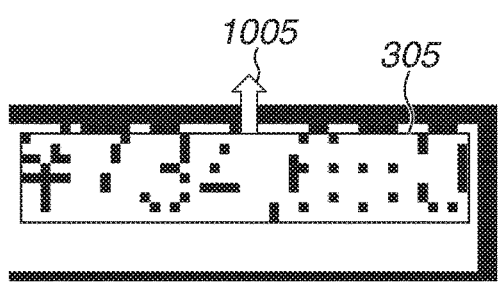
Figure 10D:
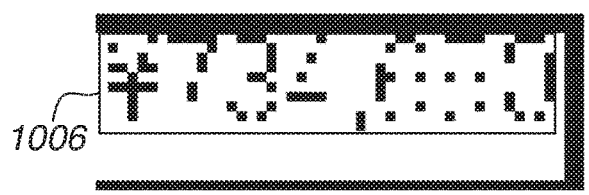

In step S904, the CPU 101 expands the text block by one pixel in the direction of the side on which the number of pixels counted in step S903 is one or more and smaller than or equal to the threshold. For example, since it is determined that the block selection processing has not been appropriately performed on the text block 305 in view of the result of searching the side 1001, the text block 305 is expanded by moving the side 1001 by one pixel in the direction indicated by an arrow 1005 as illustrated in FIG. 10C. As a result, the text block 1006 as illustrated in FIG. 10D is obtained, and a character part can be correctly selected as a text block.

In step S905, the CPU 101 determines whether the processing has been performed on all of the text blocks. If the CPU 101 determines that the processing has been performed on all of the text blocks (YES in step S905), then the processing ends. If the CPU 101 determines that the processing has not been performed on all of the text blocks (NO in step S905), the processing proceeds to step S906.

In step S906, the CPU 101 selects a block on which the processing has not yet been performed, and the processing proceeds to step S901. The description of the text block correction processing in step S807 ends.

Since the processing of step S808 to step S810 is similar to the processing of step S208 to step S210, the description of step S808 to step S810 is omitted.

As described above, the text block correction is performed by using image data whose resolution has been reduced, which reduces the number of pixels to be determined. Accordingly, the text block correction processing can be performed at a speed higher than that of the case where the resolution of image data is not reduced.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-225477, filed Nov. 30, 2018, which is hereby incorporated by reference herein in its entirety.

What is claimed is:

1. An image processing apparatus comprising:
   an extraction unit configured to extract a cluster of black pixels included in an image indicated by image data;
   a detection unit configured to detect a contour of white pixels inside the cluster of black pixels extracted by the extraction unit;
   a determination unit configured to determine, based on one or more clusters of black pixels inside the contour of white pixels, a region on which to perform character recognition processing;
   a decision unit configured to decide, based on a number of black pixels that are in contact with the region determined by the determination unit and that are outside the region determined by the determination unit, whether to perform the character recognition processing on an expanded region obtained by expanding the region determined by the determination unit rather than on the region determined by the determination unit; and
   a character recognition unit configured to perform the character recognition processing on that region decided by the decision unit.

2. The image processing apparatus according to claim 1, wherein the decision unit decides, based on a number of black pixels that are in contact with the expanded region and that are outside the expanded region, whether the character recognition unit is to perform the character recognition processing on a further-expanded region obtained by further expanding the expanded region or performs the character recognition processing on the expanded region obtained by expanding the region determined by the determination unit.

3. The image processing apparatus according to claim 1, further comprising:
   a binarization unit configured to generate binarized image data by binarizing the image data; and
   a generation unit configured to generate image data by reducing resolution of the binarized image data generated by the binarization unit,
   wherein the determination unit determines a region of a character included in an image indicated by the image data generated by the generation unit.

4. The image processing apparatus according to claim 1, further comprising a binarization unit configured to generate binarized image data by binarizing the image data,
   wherein the determination unit determines a region of a character included in an image indicated by the binarized image data generated by the binarization unit.

5. The image processing apparatus according to claim 1, further comprising a reading unit configured to read the image of a document and generate the image data.

6. The image processing apparatus according to claim 1, further comprising a receiving unit configured to receive the image data from an external apparatus.

7. The image processing apparatus according to claim 3, wherein the character recognition unit performs the character recognition processing on an expanded region obtained by expanding a region of the binarized image data generated by the binarization unit.

8. The image processing apparatus according to claim 3, wherein the binarization unit uses simple binarization processing to generate the binarized image data.

9. The image processing apparatus according to claim 1, wherein each of the region and the expanded region is a rectangular region, and
   wherein the decision unit decides, based on a number of black pixels in a region expanded, by one pixel, from each of sides of an outer periphery of the region determined by the determination unit, whether the character recognition unit is to perform the character recognition processing on the expanded region obtained by expanding the region determined by the determination unit rather than on the region determined by the determination unit.

10. The image processing apparatus according to claim 9, wherein the expanded region is expanded, by one pixel, in a direction of a side, of which a predetermined number of black pixels are present outside by one pixel, among the sides of the region determined by the determination unit.

11. The image processing apparatus according to claim 1, wherein the character recognition processing is processing for recognizing characters, one by one, in the expanded region.

12. A method of controlling an image processing apparatus comprising:
   extracting a cluster of black pixels included in an image indicated by image data;
   detecting a contour of white pixels inside the extracted cluster;
   determining, based on one or more clusters of black pixels inside the contour of white pixels, a region of the image on which to perform character recognition processing;
   deciding, based on a number of black pixels that are in contact with the region determined in the determining and that are outside the region determined in the determining, whether to perform the character recognition processing on an expanded region obtained by expanding the region determined in the determining rather than on the region determined in the determining; and performing the character recognition processing, on that region decided by the deciding.

13. A non-transitory computer-readable storage medium storing a program that, when executed by a computer, causes the computer to perform a method of controlling an image processing apparatus, the method comprising:

extracting a cluster of black pixels included in an image indicated by image data;

detecting a contour of white pixels inside the extracted cluster;

determining a region of the image on which to perform character recognition processing; and deciding, based on a number of black pixels that are in contact with the region determined in the determining and that are outside the region determined in the determining, whether to perform the character recognition processing on an expanded region obtained by expanding the region determined in the determining rather than on the region determined in the determining; and performing the character recognition processing, on that region decided by the deciding.

* * * * *